(12) United States Patent
Church

(10) Patent No.: US 8,267,364 B2
(45) Date of Patent: Sep. 18, 2012

(54) SWIVELING WINDOW MOUNT

(76) Inventor: Richard H Church, Cottonwood, AZ (US)

(*) Notice: Subject to any disclaimer, the term of this patent is extended or adjusted under 35 U.S.C. 154(b) by 478 days.

(21) Appl. No.: 12/465,243

(22) Filed: May 13, 2009

(65) Prior Publication Data

US 2010/0288896 A1 Nov. 18, 2010

(51) Int. Cl.
*E04G 3/00* (2006.01)
(52) U.S. Cl. .................. 248/227.4; 248/230.1; 248/214
(58) Field of Classification Search ............... 248/227.4, 248/230.1, 214, 229.13, 229.2, 229.23, 226.11, 248/230.4, 288.11, 288.31, 229.1, 229.14, 248/229.24, 228.4, 228.5, 230.5, 230.9, 231.51, 248/231.61, 228.2, 230.2, 231.31
See application file for complete search history.

(56) References Cited

U.S. PATENT DOCUMENTS

| 5,326,059 | A | * | 7/1994 | Pryor et al. | 248/231.71 |
| 5,664,750 | A | * | 9/1997 | Cohen | 248/231.71 |
| 5,690,604 | A | * | 11/1997 | Barnett | 600/38 |
| 5,707,036 | A | * | 1/1998 | Dunbar | 248/447.2 |
| 5,823,657 | A | * | 10/1998 | Price et al. | 362/191 |
| 6,769,657 | B1 | * | 8/2004 | Huang | 248/278.1 |
| 7,458,555 | B2 | * | 12/2008 | Mastropaolo et al. | 248/447.2 |
| 2007/0034767 | A1 | * | 2/2007 | Mastropaolo et al. | 248/447.2 |

* cited by examiner

*Primary Examiner* — Terrell McKinnon
*Assistant Examiner* — Steven Marsh
(74) *Attorney, Agent, or Firm* — The von Hellens Law Firm, Ltd.

(57) ABSTRACT

A clamp, detachably attachable to the upper edge of a vehicular window, supports one end of a swiveling arm. The other end of the arm rotatably supports a conventional platform for a spotting telescope, a telescope, or camera or other device. A handle extends from the platform for selective rotation of the supported device about the vertical and the horizontal axis. Thereby, the supported devise may be repositioned into or out of a vehicle and rotated about the vertical and horizontal axis to be aligned with the subject of interest.

12 Claims, 2 Drawing Sheets

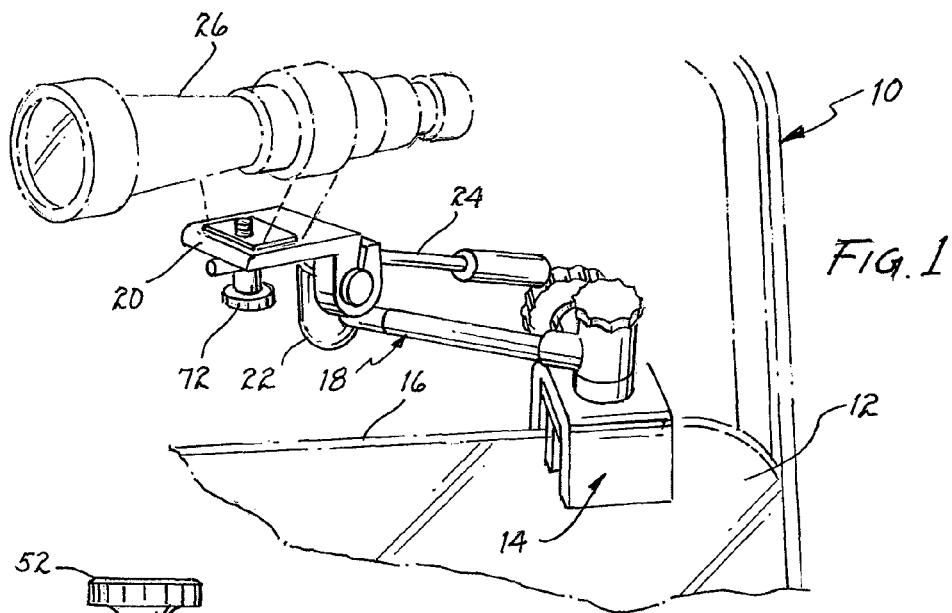
FIG. 1
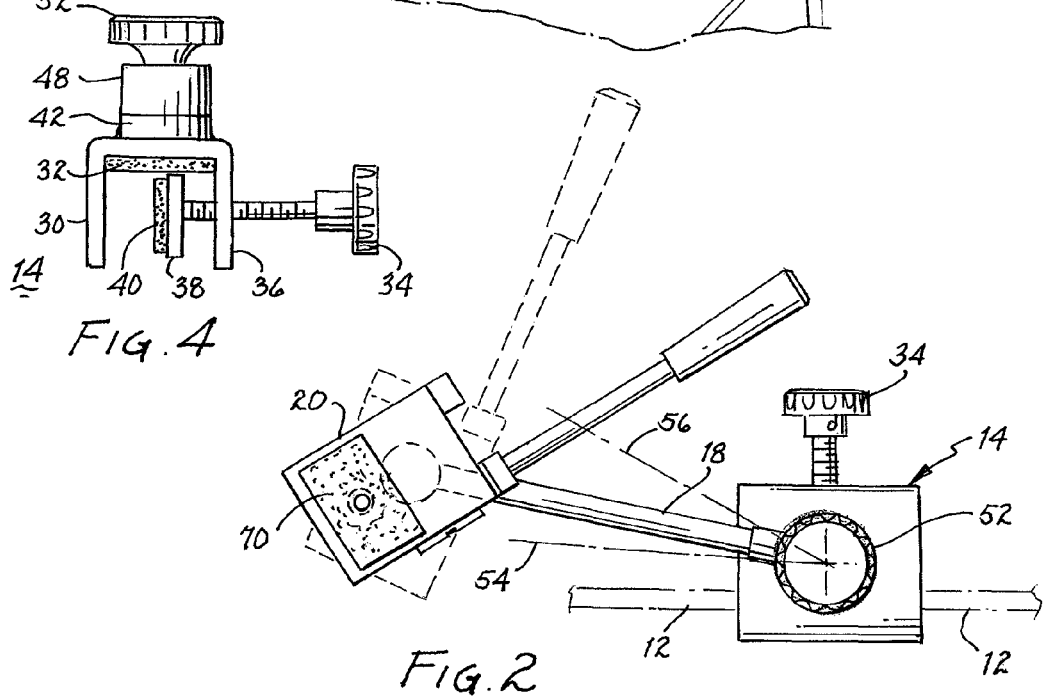
FIG. 4
FIG. 2
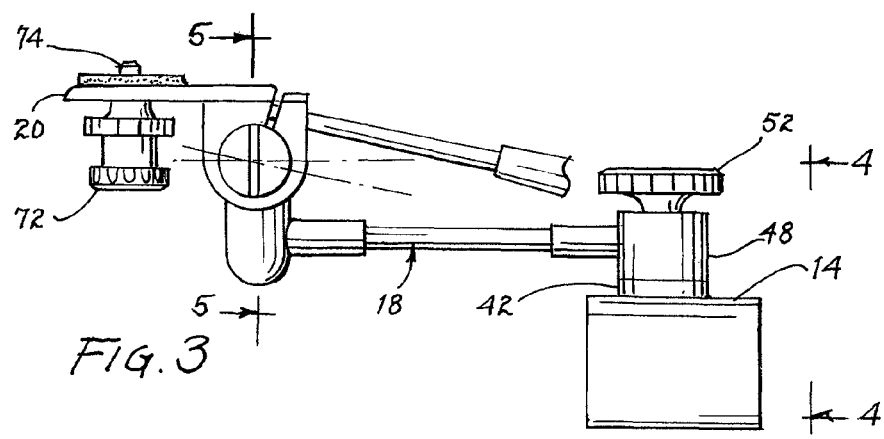
FIG. 3

SWIVELING WINDOW MOUNT

BACKGROUND OF THE INVENTION

1. Field of the Invention

The present invention relates to mountings for optical instruments, and, more particularly, to a vehicular window supported mounting for a spotting telescope.

2. Description of Related Prior Art

Hunters, bird watchers, naturalists and numerous other persons engaged in outdoor field activities use spotting telescopes to better view a subject of interest. Generally, these spotting telescopes are of high magnification and require a steady mounting to focus on and view the subject of interest. To accomplish this end, ground based, or platform based tripods are normally used to support the spotting telescope. Similarly, cameras used to capture a near or distant image are often mounted on tripods.

For a person in a vehicle who spots a subject of interest, the subject is often gone by the time the person stops the vehicle and mounts the spotting telescope, binoculars, or camera upon a tripod or other supporting device. To avoid these delays, mountings have been developed which are attachable to a vehicle, such as a window. However, to view or to capture an image of the subject of interest, the vehicle is often not correctly orientated and the opportunity to view or to capture the image is lost.

SUMMARY OF THE INVENTION

A clamp is attached to a partially open window on a vehicle and supports an arm swivelable into or out of the vehicle. The end of the arm supports a platform for mounting a spotting telescope, a pair of binoculars, a still or a movie camera, etc. The platform is tiltable about two axes to permit movement in the horizontal and vertical planes through manipulation of a handle extending therefrom. Various locking elements may be incorporated to prevent movement of the device attached to the platform.

It is therefore a primary object of the present invention to provide a mounting for an optical device attachable to the upper edge of a vehicular window that accommodates movement of the device into and out of the vehicle.

Another object of the present invention is to provide a mounting that accommodates movement of a supported optical device into a vehicle without compromising the horizontal or vertical field of view of the device.

Yet another object of the present invention is to provide a mounting attachable to the upper edge of a partly opened vehicular door window that is usable whether the door is open or closed.

Still another object of the present invention is to provide a swivelable arm attached to a vehicular window mount, which arm supports a platform for attaching a spotting telescope, a pair of binoculars or a camera.

A further object of the present invention is to provide a mounting attached to a vehicular window for supporting a spotting telescope that may be adjustably positioned into or out of the vehicle.

A yet further object of the present invention is to provide a vehicular window supported mounting for accommodating lateral movement and pivotal movement about each of the horizontal and vertical axis of a device attached to the mounting.

A still further object of the present invention is to provide a method for positioning a device laterally and pivotally about the horizontal and vertical axis with respect to a supporting structure.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 illustrates a mounting attached to the upper edge of a vehicular window for supporting a spotting telescope;

FIG. 2 is a top view illustrating the swiveling capability of a supporting arm and the capability of angular movement of the supported element about a vertical axis;

FIG. 3 is a side view illustrating movement of the supported element about a horizontal axis;

FIG. 4 is an end view taken along lines 4-4, as shown in FIG. 3;

DESCRIPTION OF THE PREFERRED EMBODIMENT

Figure 5:
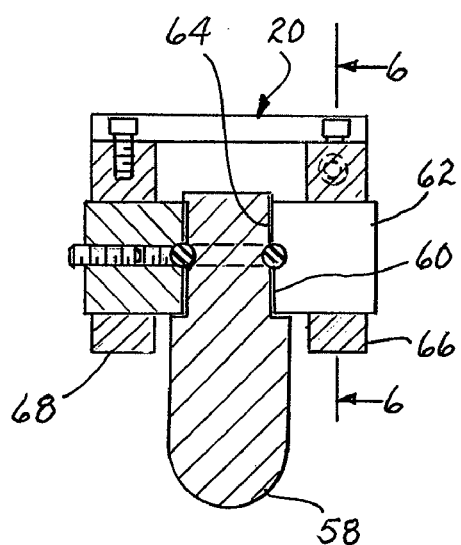
FIG. 5 is a cross-sectional view taken along the lines 5-5, shown in FIG. 3.
Figure 6:
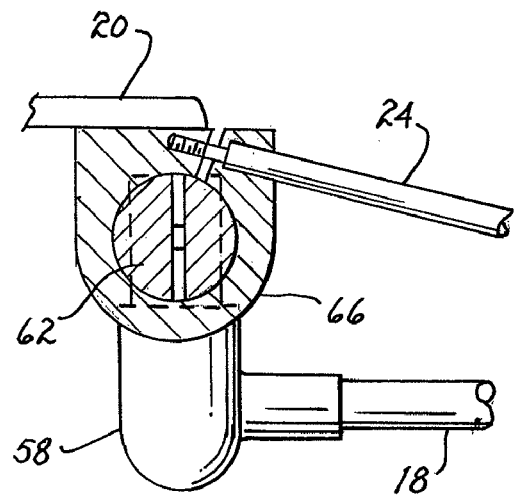
FIG. 6 is a cross-sectional view taken along lines 6-6, as shown in FIG. 5.

Referring to FIG. 1, there is illustrated a representative door frame 10 of a vehicle, such as a conventional truck or passenger car. A partly open window 12 is supported by the door frame. A clamp 14 is detachably attached to receive upper edge 16 of window 12. Clamp 14 supports a swivel arm 18. A platform 20 is attached to free end 22 of arm 18. The platform may include a handle 24 extending therefrom for tilting the platform about the horizontal axis and for rotating the platform about the vertical axis. Various devices, such as spotting telescopes, binoculars, still cameras, movie cameras, etc. may be mounted on platform 20. A spotting telescope 26 mounted on the platform is illustrated.

Figure 7:
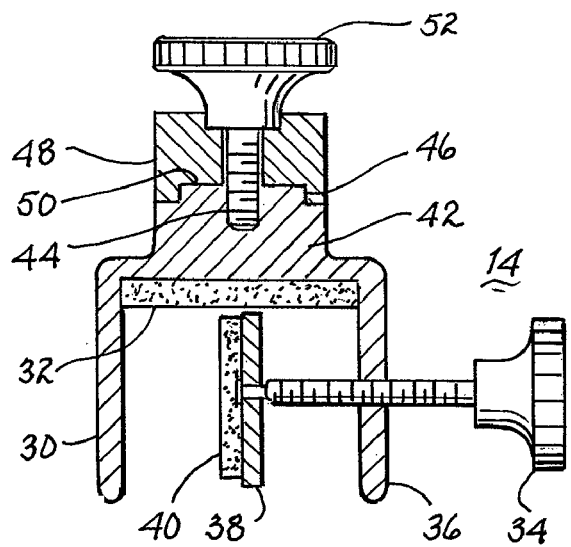
FIG. 7 is a cross-sectional view of the mounting shown in FIG. 4.

Referring jointly to FIGS. 2, 4 and 7, clamp 14 will be discussed in further detail. The clamp includes a downwardly extending U-shaped bracket 30 having padding 32, or the like, disposed at the upper surface thereof to contact, without damage, edge 14 of window 12. A thumb screw 34 is in threaded engagement with side 36 and supports a plate 38 having padding 40 attached thereto to bear against the side of window 12. Thereby, clamp 14 can be firmly mounted upon the upper edge of window 12.

Clamp 14 includes a boss 42 having a threaded cavity 44. The upper end of the boss includes a circular protrusion 46. A cylinder 48 includes a circular indentation 50 for receiving protrusion 46 and is rotatable therewith. A thumb screw 52 extends through cylinder 48 into threaded engagement with cavity 44. Thereby, the thumb screw will permit clamping of cylinder 48 to boss 42 at a selected rotational orientation therebetween.

Referring jointly to FIGS. 1, 2 and 3, the function and purpose of swivel arm 18 will be described. The arm is attached to cylinder 48 permanently or by threaded engagement therewith. By loosening thumb screw 52, cylinder 48 becomes unlocked with respect to boss of 42 and the cylinder maybe pivoted about the vertical axis. Commensurate pivotal movement of arm 48 is depicted in FIG. 2 by dashed lines 54, 56. The arm may swing inwardly or outwardly with respect to window 12. Thus, a user seated within the vehicle may bring spotting telescope 26, or other device attached to platform 20, toward himself/herself for convenience or comfort. Alternatively, arm 18 may be pivoted outside window 12 to permit a greater field of view by the device attached to platform 20 and without the impediment of a vehicular structure. Once the arm is located at a position of choice, thumb screw 52 may be tightened to positional lock the arm in place.

Referring jointly to FIGS. 1, 2, 3, 5 and 6, platform 20 and its corresponding elements and support will be described. Free end 22 of arm 18 includes and upwardly extending shaft 58 having a necked down section 60. A cylinder 62 includes a cylindrical passageway 64 extending therethrough for receiving section 60. Thereby, cylinder 62 is pivotable about the axis of section 60. Various means known to those skilled in the art may be employed to maintain cylinder 62 mounted upon section 60 to permit rotational movement of the cylinder about the section and yet maintain the two elements attached to one another. A clamp 66 extends from platform 20 into circumferential engagement with one end of cylinder 62. Ear 68 extends from platform 20 for encircling the other end of cylinder 62. Handle 24 is in threaded engagement with clamp 62 in the conventional manner whereby rotation of the handle in one direction will cause frictional engagement of the clamp with cylinder 62 and release such frictional engagement when the arm is turned in the other direction. Handle 24 also serves the purpose of effecting location of cylinder 62 about section 60 and rotation of platform 20 about the axis of cylinder 62. Thereby, handle 24 will provide orientation of an attached device, such as a spotting telescope 26, about the vertical and the horizontal axis. Such movement about the vertical axis is particularly illustrated in dashed lines in FIG. 2.

As noted in FIGS. 1 and 2, padding 70 may be disposed on platform 20 to protect the device attached thereto. A thumb screw 72 is captured by and extends through platform 20 to provide a threaded element 74 extending upwardly from platform 20 for threaded engagement with the device to be mounted on the platform. Thereby, rapid attachment and detachment of such device from the platform may be readily effected.

In operation, clamp 14 is attached to window 12 and the device to be attached to platform 20 is mounted. After such mounting, the device may be swung into or out of the vehicle, depending upon the preference of the user. Additionally, the device may be aimed in the direction of the subject of interest by rotating the platform about the vertical axis and the horizontal axis. All such movement may be carried out from inside the vehicle and at a location convenient to the user. It is to be understood that the present invention may be used with equal facility whether the door on the vehicle is open or closed and whether the user is inside or outside the vehicle.

I claim:

1. A swivel mounting for a device, said mounting comprising in combination:
   a) a clamp for attachment to a supporting element;
   b) an arm extending from and rotatably attached to said clamp, said arm including a free end;
   c) said clamp including means for rotating said arm about a vertical axis;
   d) a shaft extending upwardly from said free end, said shaft comprising a boss and a cylinder being rotatably attached to said boss;
   e) a further clamp mounted on said cylinder;
   f) a handle extending from said further clamp, said handle including threads for engaging corresponding threads in said further clamp to tighten and loosen said further clamp about said cylinder; and
   g) a platform for supporting the device, said platform being attached to said further clamp.

2. The mounting as set forth in claim 1 including a screw extending from said cylinder for lockingly engaging a groove in said boss to permit rotation of said cylinder about said boss while preventing disengagement of said cylinder from said boss.

3. The mounting as set forth in claim 1 wherein said arm is fixedly attached to said shaft.

4. A swivel mounting for a device, said mounting comprising in combination:
   a) a clamp for attachment to a supporting element;
   b) an arm extending from and rotatably attached to said clamp, said arm including a free end, including a thumb screw for preventing rotation of said arm relative to said clamp;
   c) said clamp including means for rotating said arm about a vertical axis;
   d) a shaft extending upwardly from said free end;
   e) a cylinder rotatably mounted on said shaft;
   f) a further clamp mounted on said cylinder;
   g) a handle extending from said further clamp, said handle including threads for engaging corresponding threads in said further clamp to tighten and loosen said further clamp about said cylinder; and
   h) a platform for supporting the device, said platform being attached to said further clamp.

5. The mounting as set forth in claim 4 said platform including a screw for attaching the device thereto.

6. A swivel mounting attached to the upper edge of a vehicular window for supporting a device, said mounting comprising in combination:
   a) a clamp for detachable attachment to the upper edge of the window;
   b) an arm having one end pivotally attached to said clamp for pivoting the arm to a location on one side or the other side of the window;
   c) a shaft extending upwardly from an other end of said arm;
   d) a cylinder rotatably mounted on said shaft, said shaft including a boss for rotatably supporting said cylinder;
   e) a further clamp mounted on said cylinder;
   f) a handle extending from said further clamp, said handle including threads for engaging corresponding threads in said further clamp to tighten and loosen said further clamp about said cylinder;
   g) a platform attached to said further clamp; and
   h) means for detachably attaching the device to said platform.

7. A method for mounting a device on the window of a vehicle to permit movement of the device from one side of the window to the other side of the window, said method comprising the steps of:
   a) clamping the mounting on the edge of the window;
   b) swiveling an arm having one end extending from the clamp to locate the other end of the arm in a range of locations on either side of the window;
   c) rotating a platform at the other end of the arm about a first axis;
   d) further rotating the platform at the other end of the arm about a second axis, the second axis being orthogonal to the first axis;
   e) manually exercising said steps of rotating and further rotating through movement of a handle secured proximate the other end of the arm; and
   f) detachably attaching the device to the platform.

8. A method set as forth in claim 7 including the step of positionally locking the arm relative to the clamp.

9. A method set as forth in claim 8 wherein said locking step is carried out by the step of turning a thumb screw.

10. A method as set forth in claim 8 including the step of adjusting the platform in each of the first and second axes to align the device with a subject of interest.

11. A method as set forth in claim 10 wherein the first and second axes correspond with horizontal and vertical axes and including the step of moving the platform in the horizontal and vertical axes and the step of positionally locking the platform in the horizontal axis.

12. A method as set forth in claim 10 wherein said step of clamping includes the step of turning a thumb screw.

* * * * *